(12) United States Patent
Abe et al.

(10) Patent No.: US 12,312,186 B2
(45) Date of Patent: May 27, 2025

(54) WORKPIECE CONVEYANCE DEVICE

(71) Applicant: Panasonic Holdings Corporation, Osaka (JP)

(72) Inventors: Ryuta Abe, Osaka (JP); Tatsuya Masada, Hyogo (JP); Masahide Maruyama, Nara (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 138 days.

(21) Appl. No.: 18/247,053

(22) PCT Filed: Jul. 16, 2021

(86) PCT No.: PCT/JP2021/026754
§ 371 (c)(1),
(2) Date: Mar. 28, 2023

(87) PCT Pub. No.: WO2022/070558
PCT Pub. Date: Apr. 7, 2022

(65) Prior Publication Data
US 2023/0406649 A1 Dec. 21, 2023

(30) Foreign Application Priority Data

Sep. 30, 2020 (JP) .................................. 2020-164620

(51) Int. Cl.
*B65G 54/02* (2006.01)
*B65G 47/91* (2006.01)

(52) U.S. Cl.
CPC ............. *B65G 54/02* (2013.01); *B65G 47/91* (2013.01)

(58) Field of Classification Search
None
See application file for complete search history.

(56) References Cited

U.S. PATENT DOCUMENTS

| 9,422,121 B2* | 8/2016 | Staunton | B65G 47/912 |
| 11,575,144 B2* | 2/2023 | Abe | B65H 31/24 |
| 12,107,467 B2* | 10/2024 | Hauer | H02K 1/14 |

FOREIGN PATENT DOCUMENTS

JP 2008-282756 A 11/2008

OTHER PUBLICATIONS

International Search Report issued in corresponding International Application No. PCT/JP2021/026754, dated Sep. 14, 2021, with English translation.

* cited by examiner

*Primary Examiner* — Kavel Singh
(74) *Attorney, Agent, or Firm* — Rimon P.C.

(57) ABSTRACT

A workpiece conveyance device includes: a plurality of holding heads that include a holding part and a vacuum pump; and a conveyance track. The vacuum pump includes a pump unit and a shaft part that is rotated to activate the pump unit. The shaft part includes a first magnet. The conveyance track includes a second magnet extending in a conveyance direction of the holding head and being arranged to generate a magnetic force between the second magnet and the first magnet. By alternately switching a magnetic pole of a portion in the second magnet applying a magnetic force to the first magnet, the shaft part is rotated, which causes the pump unit to generate a holding force.

10 Claims, 11 Drawing Sheets

WORKPIECE CONVEYANCE DEVICE

CROSS-REFERENCE TO RELATED APPLICATIONS

This application is the U.S. National Phase under 35 U.S.C. § 371 of International Patent Application No. PCT/JP2021/026754, filed on Jul. 16, 2021, which in turn claims the benefit of Japanese Patent Application No. 2020-164620, filed on Sep. 30, 2020, the entire content of each of which is incorporated herein by reference.

BACKGROUND

Field of the Invention

The present disclosure relates to a workpiece conveyance device.

Description of the Related Art

As in-vehicle batteries, for example, laminate-type batteries have been developed. Such a battery has a structure in which a container contains a laminated electrode assembly, in which multiple positive electrode plates and multiple negative electrode plates are alternatively laminated with a separator in between, and an electrolyte. For example, patent literature 1 discloses manufacturing of a laminate-type battery in which individual pieces of electrodes and separators are sucked by a suction pad by vacuum suction, conveyed to a lamination stage, and layered on the stage. Such a conveyance method is not limited to electrode plates and separators but could also be employed to convey other workpieces.
Patent Literature 1: JP2008-282756

In vacuum suction, it is necessary to connect the suction pad and the vacuum pump by vacuum pipes. It is also necessary to connect the vacuum pump and the driving power supply by wirings. In the case the vacuum pump and the driving power supply are provided outside to move the suction pad, therefore, the vacuum pipes and the wirings may be entangled if the conveyance distance of the electrode plate, etc. is long or the conveyance route is complicated (e.g., includes branches or junctions). Thus, installation of vacuum pipes and wirings has imposed restriction on the design flexibility of the workpiece conveyance device.

SUMMARY OF THE INVENTION

The present disclosure addresses the issue described above, and a purpose thereof is to provide a technology of increasing the design flexibility of a workpiece conveyance device.

An embodiment of the present disclosure relates to a workpiece conveyance device. The device includes: a plurality of holding heads that include a holding part that holds a workpiece and a vacuum pump that generates a holding force in the holding part; and a conveyance track that conveys the plurality of holding heads. The vacuum pump includes a pump unit that connects with the holding part to suck a surrounding air (atmosphere) from the holding part or to discharge the surrounding air to the holding part, the vacuum pump further including a shaft part that is rotated to activate the pump unit. The shaft part includes a first magnet magnetized in an alternating N poles and S poles around a shaft. The conveyance track includes a second magnet extending in a conveyance direction of the holding head, the second magnet alternately generating a magnetic force from the N pole and a magnetic force from the S pole in the conveyance direction and being arranged to generate a magnetic force between the second magnet and the first magnet of the holding head conveyed. By alternately switching a magnetic pole of a portion in the second magnet applying a magnetic force to the first magnet, the shaft part is rotated, which causes the pump unit to generate a holding force by sucking or discharging the surrounding air.

Optional combinations of the aforementioned constituting elements, and implementations of the present disclosure in the form of methods, devices, systems, etc. may also be practiced as additional modes of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
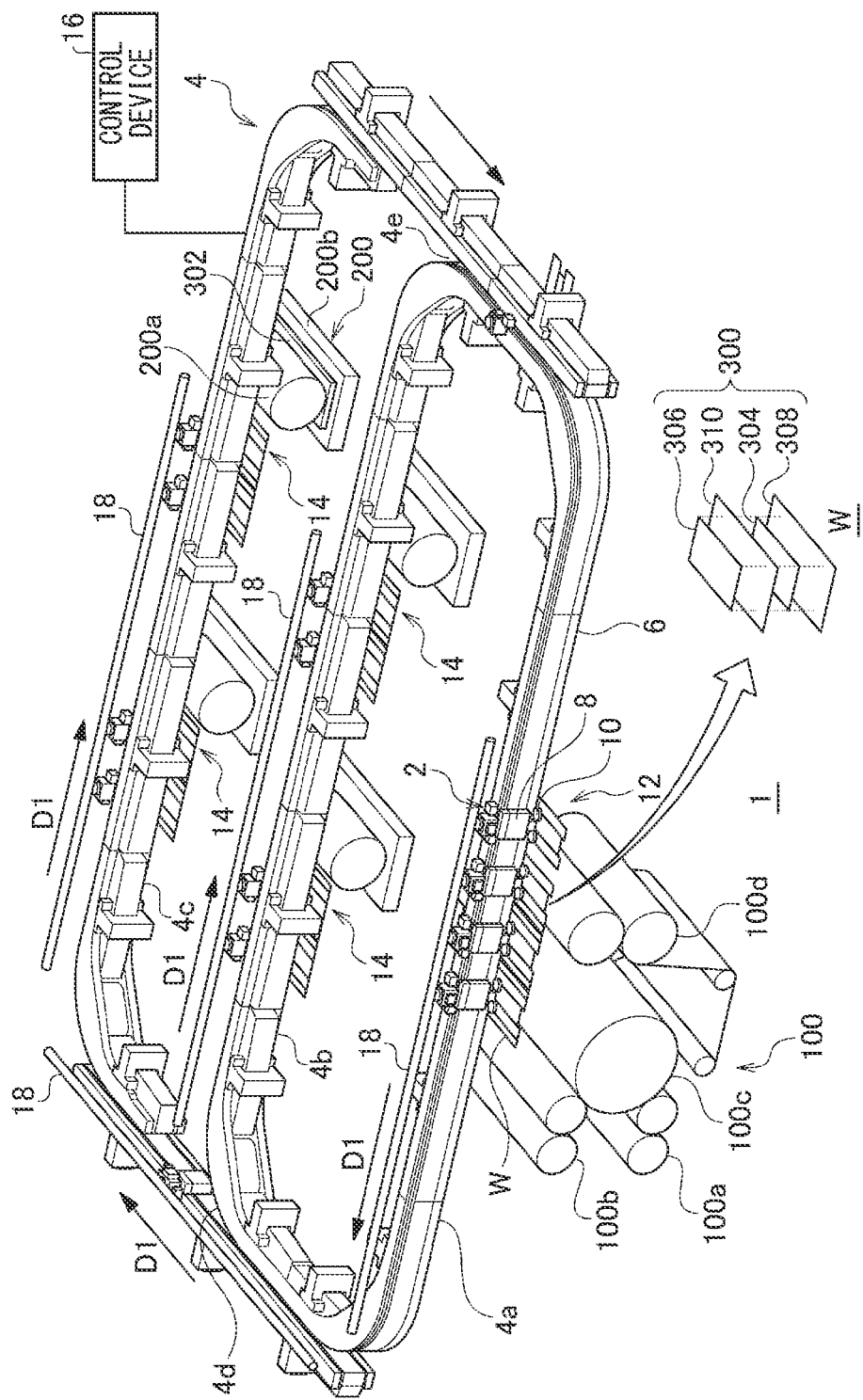
FIG. 1 is a perspective view of a workpiece conveyance device according to embodiment 1.

Hereinafter, the present disclosure will be described based on preferred embodiments with reference to the accompanying drawings. The embodiments are not intended to limit the scope of the present disclosure but exemplify the present disclosure. Not all of the features and the combinations thereof described in the embodiments are necessarily essential to the present disclosure. Identical or like constituting elements, members, processes shown in the drawings are represented by identical symbols and a duplicate description will be omitted as appropriate.

The scales and shapes shown in the figures are defined for convenience's sake to make the explanation easy and shall not be interpreted limitatively unless otherwise specified. Terms like "first", "second", etc. used in the specification and claims do not indicate an order or importance by any means unless specified otherwise and are used to distinguish a certain feature from the others. Those of the members that are not important in describing the embodiment are omitted from the drawings.

Embodiment 1

Figure 2:
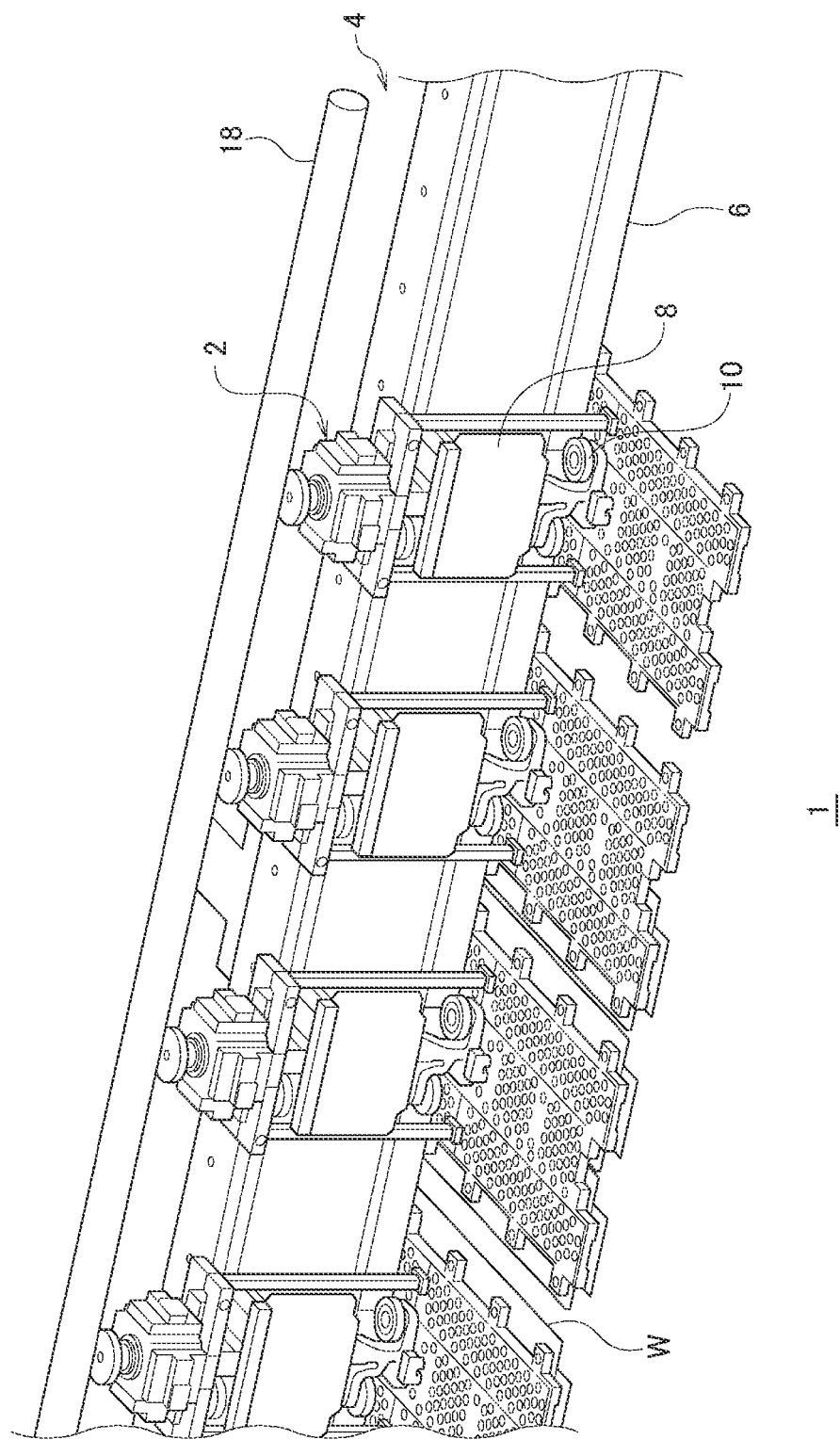
FIG. 2 is a perspective view showing a part of the workpiece conveyance device on an enlarged scale.

FIG. 1 is a perspective view of a workpiece conveyance device 1 according to embodiment 1. FIG. 2 is a perspective view showing a part of the workpiece conveyance device 1 on an enlarged scale. In FIG. 2, illustration of a cover plate 32 of a holding head 2 is omitted.

The workpiece conveyance device 1 includes multiple holding heads 2 and a conveyance track 4. Each holding head 2 of this embodiment sucks and holds a workpiece W by a suction force generated by sucking a surrounding air. By way of one example, the workpiece W includes at least one of an electrode plate or a separator of a battery. The workpiece W of this embodiment is a laminated sheet 300 (unit laminated body) in which an electrode plate and a separator are laminated. The laminated sheet 300 is a unit constituting a laminated electrode body 302. In other words, multiple unit laminated bodies 300 are laminated, and the laminated electrode body 302 is obtained accordingly. The workpiece W is not limited to a component constituting a battery such as the electrode plate, the separator, and the laminated sheet 300.

The conveyance track 4 is a mechanism to convey the multiple holding heads 2. Each holding head 2 travels on the conveyance track 4, using the conveyance track 4 as a guide rail. The conveyance track 4 includes a publicly known conveyance mechanism for conveying each holding head 2. The conveyance track 4 of this embodiment includes a publicly known linear conveyance mechanism by way of one example. More specifically, the conveyance track 4 includes a rail part 6 (stator) having built therein multiple coils (not shown) arranged in the direction of extension. Further, each holding head 2 (movable part) includes a conveyance magnet 8 at a position that faces the coil when the holding head 2 is hung from the rail part 6. The conveyance magnet 8 is, for example, a permanent magnet.

By applying the magnetic flux generated by energizing each coil to the conveyance magnet 8, a thrust force along the rail part 6 and a force attracting the holding head 2 toward the rail part 6 are generated in the holding head 2. This causes the holding head 2 to travel along the rail part 6. The holding head 2 includes a roller slidably in contact with the rail part 6, and the distance to the rail part 6 is maintained by the roller 10. The linear conveyance mechanism is publicly known, and a further detailed description thereof is omitted. The conveyance track 4 may include a conveyance mechanism other than a linear conveyance mechanism such as a mechanism for hauling the holding head 2 by a chain, etc.

The conveyance track 4 of this embodiment branches into multiple tracks. Further, the conveyance track 4 includes a reception part 12 and a delivery part 14. In the reception part 12, the holding head 2 receives the laminated sheet 300 from a laminated sheet manufacturing device 100 (unit laminated body manufacturing device). Further, the holding head 2 discharges, in the delivery part 14, the laminated sheet 300 to a laminating device 200. The laminating device 200 is a device to manufacture the laminated electrode body 302 by laminating multiple unit laminated bodies 300. Further, multiple delivery parts 14 are provided for one reception part 12. FIG. 1 schematically shows the laminated sheet manufacturing device 100 and the laminating device 200, and illustration of the structure is omitted in part. The structures of the devices need not be as illustrated.

By way of example, the conveyance track 4 has a loop structure elongated in a predetermined direction, and a part of the loop splits into two tracks extending in parallel. In other words, the conveyance track 4 includes a first track 4a and a second track 4b and a third track 4c that branch from one end of the first track 4a. The second track 4b and the third track 4c branching from the first track 4a meet the first track 4a at the other ends. In other words, a branch point 4d is provided at one end of the first track 4a, and a meeting point 4e is provided at the other end of the first track 4a. The reception part 12 is provided in the first track 4a. Two delivery parts 14 are provided in each of the second track 4b and the third track 4c. In each of the second track 4b and the third track 4c, the two delivery parts 14 are arranged in series. The embodiment is non-limiting as to the shape of the conveyance track 4. The conveyance track 4 need not include the branch point 4d or the meeting point 4e or include two or more branch points 4d or meeting points 4e.

In the reception part 12, the holding head 2 receives the laminated sheet 300 as a workpiece W from the laminated sheet manufacturing device 100 and travels on the first track 4a. The holding head 2 arriving at the branch point 4d leading to the second track 4b and the third track 4d is caused by a control device 16 to advance to either the second track 4b or the third track 4c. The control device 16 is configured to switch the destination of the holding head 2 by controlling energization of the coil built in the rail part 6. The control device 16 may be implemented by an element such as a CPU or memory of a computer or by a circuit as a hardware configuration, and by a computer program or the like as a software configuration. FIG. 1 illustrates a functional block implemented by cooperation of such components. It will be naturally understood by those skilled in the art that the functional block may be implemented in a variety of forms by combinations of hardware and software.

The holding head 2 advancing on the second track 4b or the third track 4c delivers the laminated sheet 300 to the laminating device 200 in the delivery part 14. The holding head 2 discharging the laminated sheet 300 advances further on the second track 4b or the third track 4c, returns from the meeting point 4e to the first track 4a, and reaches the reception part 12 again. The holding head 2 receives the laminated sheet 300 in the reception part 12 and is conveyed to the delivery part 14.

By way of one example, the laminated sheet manufacturing device 100 is a continuous drum-type manufacturing device in which multiple drums are combined. The processes of cutting, heating, bonding, laminating, and the like of electrode bodies and separators are performed in the drums. This enables high-speed and continuous manufacturing of the laminated sheet 300. In the laminated sheet manufacturing device 100, multiple individual pieces of first electrode plates 304 are obtained by a first electrode cutting drum 100a. Further, multiple individual pieces of second electrode plates 306 are obtained by a second electrode cutting drum 100b.

The first electrode plate 304 and the second electrode plate 306 are preheated and supplied to an adhesion drum 100c. Further, a continuous sheet (continuous body) of a first separator 308 and a continuous sheet of a second separator 310 are supplied to the adhesion drum 100c. The continuous sheet of the first separator 308, the multiple first electrode plates 304, the continuous sheet of the second separator 310, and the multiple second electrode plates 306 are laminated and pressurized in this order to form a continuous laminated body in which multiple unit laminated bodies 300 are continuously arranged. The continuous laminated body is cut by a separator cutting drum 100d into multiple individual pieces of the laminated sheet 300. The individual pieces of the laminated sheet 300 are conveyed to the reception part 12 and delivered to the holding head 2.

The laminated sheet 300 is delivered from the holding head 2 to the laminating device 200 in the delivery part 14. The laminating device 200 includes a laminating drum 200a. The laminating drum 200a sequentially conveys the multiple unit laminated bodies 300 received from the holding head 2 to the lamination stage 200b and discharges the unit laminated bodies 300 to the lamination stage 200b. This causes the unit laminated bodies 300 to be layered on the lamination stage 200b, and the laminated electrode body 302 is obtained accordingly. The laminated electrode body 302 thus formed is retrieved from the lamination stage 200b to be forward to the device for the next step. The laminated sheet 300 may be directly delivered from the holding head 2 to the laminating drum 200a, or a relay drum may be disposed between the holding head 2 and the laminating drum 200a.

Moreover, the conveyance track 4 includes a second magnet 18 extending in a conveyance direction D1 of the holding head 2. The second magnet 18 extends in a range in the conveyance track 4 in which the holding head 2 carrying the workpiece W travels. Further, the second magnet 18 is provided to in proximity to the holding head 2 traveling on the conveyance track 4. The structure and working of the second magnet 18 will be described in detail later.

Figure 3:
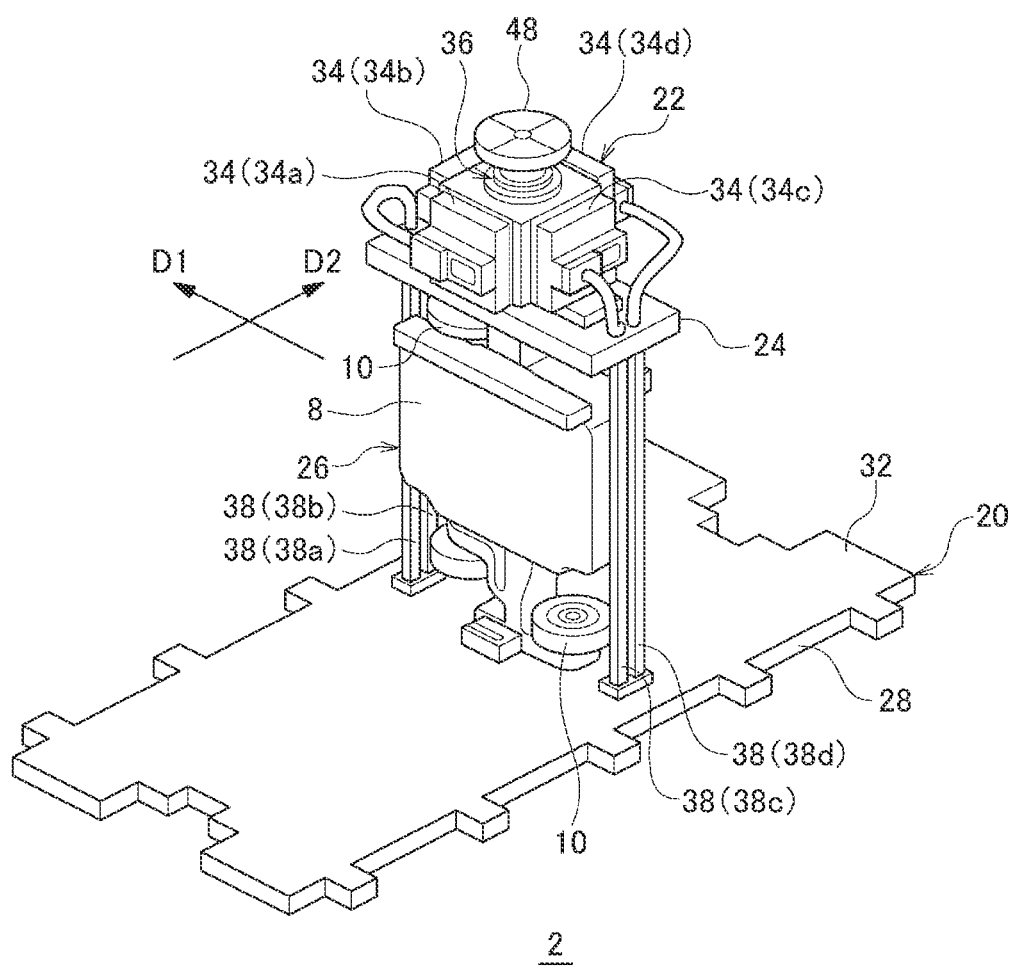
FIG. 3 is a perspective view of the holding head viewed from diagonally above.
Figure 4:
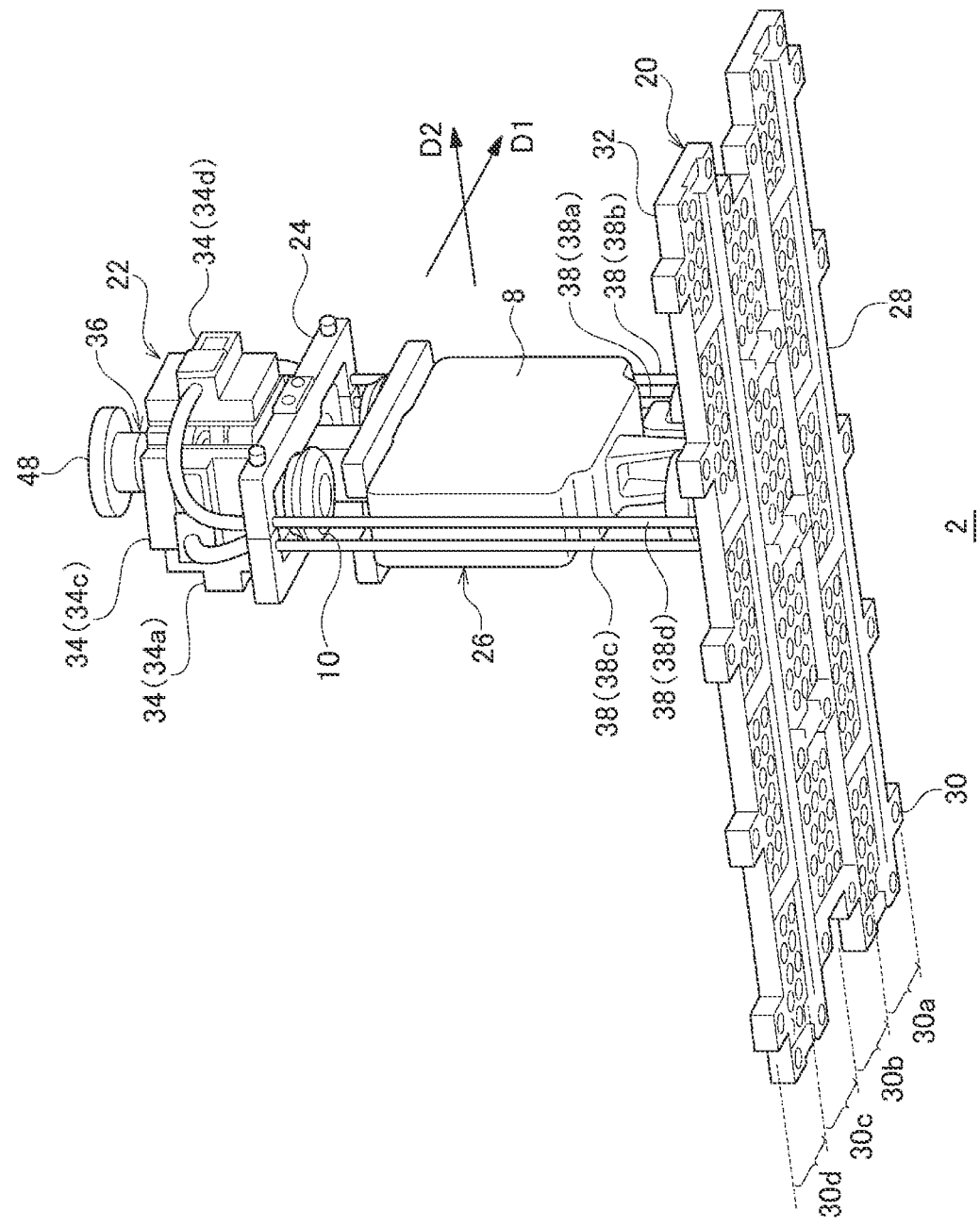
FIG. 4 is a perspective view of the holding head viewed from diagonally below.
Figure 5A:
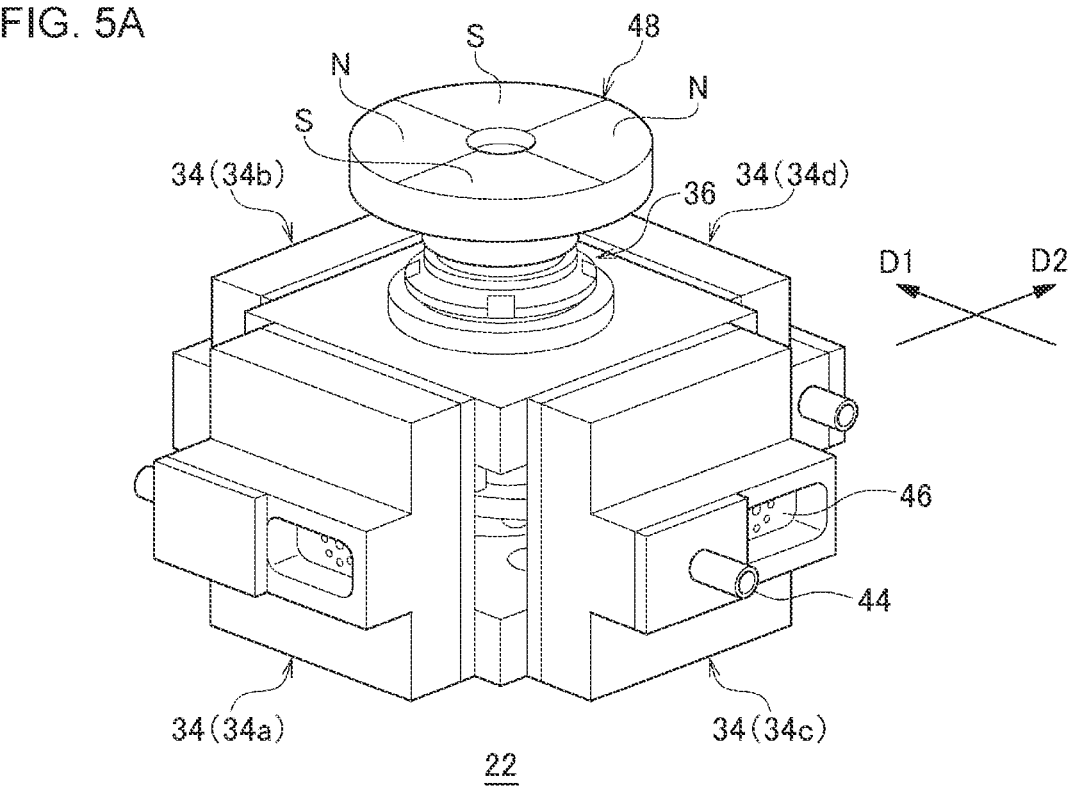
FIG. 5A is a perspective view of a vacuum pump.
Figure 5B:
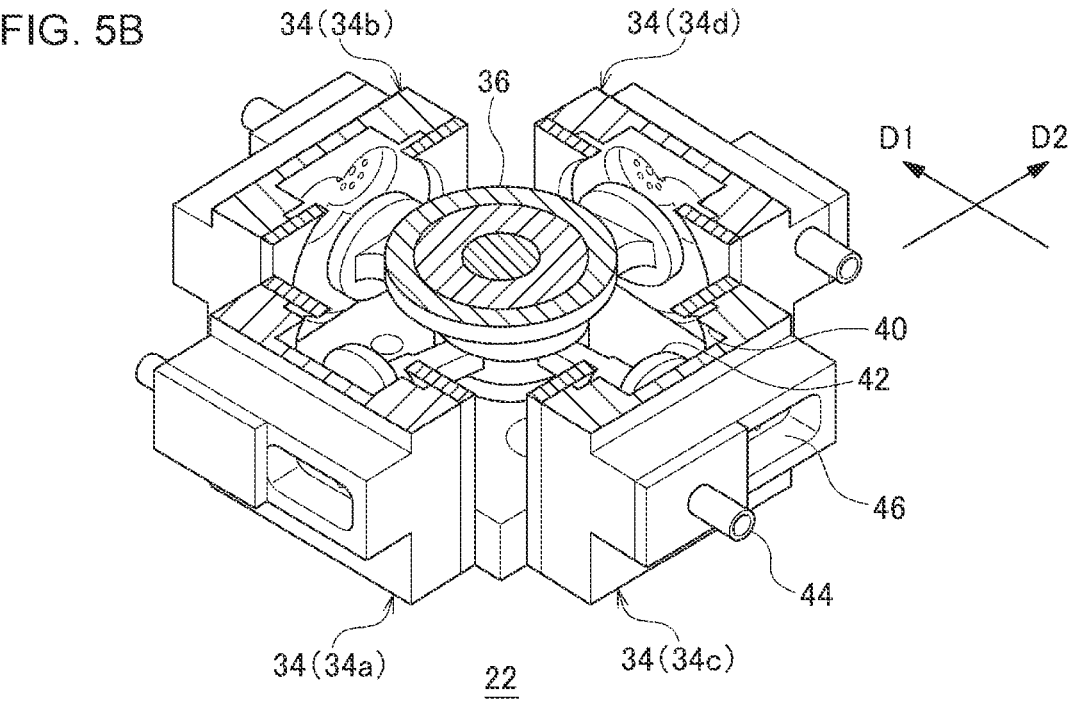
FIG. 5B is a perspective view of the cross section of the vacuum pump.

FIG. 3 is a perspective view of the holding head 2 viewed from diagonally above. FIG. 4 is a perspective view of the holding head viewed from diagonally below. FIG. 5A is a perspective view of a vacuum pump 22, and FIG. 5B is a perspective view of the cross section of the vacuum pump 22. The holding head 2 includes a pad part 20, a vacuum pump 22, a holding cancellation valve 24, a support part 26, a conveyance magnet 8, and a roller 10. The support part 26 extends in a predetermined direction (e.g., the vertical direction). The pad part 20 is fixed to one end of the support part 26, and the vacuum pump 22 is fixed to the other end. The holding cancellation valve 24, the conveyance magnet 8, and the roller 10 are fixed between the pad part 20 and the vacuum pump 22 in the support part 26.

The pad part 20 has a shape of a flat plate elongated in a perpendicular direction D2 perpendicular to the conveyance direction D1 of the holding head 2. The pad part 20 is oriented such that one principal surface thereof faces the laminated sheet manufacturing device 100 in the reception part 12 and faces the laminating device 200 in the delivery part 14. The one principal surface constitutes a holding part 28 for holding the workpiece. The holding part 28 of this embodiment is comprised of a suction surface that sucks the workpiece W. The holding part 28 includes multiple suction holes 30. The multiple suction holes 30 are distributed in the planar direction of the holding part 28.

The multiple suction holes 30 are organized into four groups including a first suction hole group 30a, a second suction hole group 30b, a third suction hole group 30c, and a fourth suction hole group 30d. In each suction hole group, the suction holes 30 are arranged at predetermined intervals in the perpendicular direction D2. A first suction hole group 30a, a second suction hole group a third suction hole group 30c, and a fourth suction hole group 30d are arranged in the stated order, starting at the front side (downstream side) of the conveyance direction D1 of the holding head 2. In each suction hole group, the suction holes 30 are connected to each other by a connecting pipe (not shown) extending in the perpendicular direction D2. The connecting pipe is connected to the vacuum pump 22 via a vacuum pipe 38 described later. A cover plate 32 is provided on the principal surface of the pad part 20 opposite to the holding part 28.

The vacuum pump 22 is a device configured to generate a holding force in the holding part 28. The vacuum pump 22 includes a pump unit 34, a shaft part 36, and a vacuum pipe 38. The vacuum pump 22 of this embodiment is comprised of a publicly known diaphragm pump by way of one example. The embodiment is non-limiting as to the structure of the vacuum pump 22 so long as it can generate a holding force in the holding part 28 as the shaft part 36 is rotated.

The vacuum pump 22 of this embodiment includes multiple pump units 34. By way of one example, the vacuum pump 22 includes four pump units 34. Each pump unit 34 includes a pump chamber 40, a diaphragm drive shaft 42, an air inlet 44, and an air outlet 46. The air inlet 44 and the air outlet 46 are connected to the pump chamber 40 to establish communication between the spaces inside and outside the pump chamber 40. Further, the pump chamber 40 includes a diaphragm (not shown), and the diaphragm drive shaft 42 is connected to the diaphragm. The diaphragm drive shaft 42 is connected to the shaft part 36.

The shaft part 36 is rotated to activate the pump unit 34 by causing the diaphragm drive shaft 42 to make a reciprocal movement. The shaft part 36 is a so-called crankshaft. The reciprocal movement of the diaphragm drive shaft 42 elastically deforms the diaphragm, which causes the surrounding air outside the pump chamber 40 to be sucked from the air inlet 44 into the space inside the pump chamber 40 and causes the surrounding air inside the pump chamber 40 to be discharged from the air outlet 46 to the space outside the pump chamber 40.

Each pump unit 34 communicates with the holding part 28 by way of the vacuum pipe 38 and sucks the surrounding air from each suction hole 30 of the holding part 28. More specifically, one end of the vacuum pipe 38 is connected to the air inlet 44. Further, the other end of the vacuum pipe 38 is connected to the connecting pipe of the pad part 20. Thus, when each pump unit 34 is activated by the rotation of the shaft part 36, the surrounding air is sucked from the suction hole 30 to generate a suction force, i.e., a holding force, in the holding part 38. The diaphragm drive shafts 42 of the pump units 34 are coupled to the same shaft part 36. Therefore, the pump units 34 generate a holding force by the rotation of the common shaft part 36.

The holding head 2 holds one workpiece W by means of at least two pump units 34. Further, the holding head 2 holds multiple workpieces W. By way of one example, the two of the four pump units 34 hold one workpiece W, and the other two pump units 34 hold another workpiece W.

More specifically, the four pump units 34 and the first suction hole group 30a—the fourth suction hole group are associated one to one, and the suction hole groups are connected to the different pump units 34 via the vacuum pipe 38. Hereinafter, the pump unit 34 and the vacuum pipe 38 connected to the first suction hole group 30a will be referred to as a first pump unit 34a and a first vacuum pipe 38a. Further, the pump unit 34 and the vacuum pipe 38 connected to the second suction hole group 30b will be referred to as a second pump unit 34b and a second vacuum pipe 38b. Further, the pump unit 34 and the vacuum pipe 38 connected to the third suction hole group 30c will be referred to as a third pump unit 34c and a third vacuum pipe 38c. Further, the pump unit 34 and the vacuum pipe 38 connected to the fourth suction hole group 30d will be referred to as a fourth pump unit 34d and a fourth vacuum pipe 38d.

The two workpieces W held by the respective holding heads 2 are arranged in the conveyance direction D1 of the holding heads 2. The workpiece W located in front in the conveyance direction D1 is sucked by the first suction hole group 30a and the second suction hole group 30b. The workpiece W located behind in the conveyance direction D1 is sucked by the third suction hole group 30c and the fourth suction hole group 30d. Hereafter, the workpiece W located in front will be referred to as a front workpiece W1, and the workpiece W located behind will be referred to as a rear workpiece W2 for convenience.

The shaft part 36 is provided with a first magnet 48. The first magnet 48 has a disc shape and are magnetized to result in N poles and S poles alternating around the shaft. The first magnet 48 is, for example, a permanent magnet. The shaft part 36 is configured to be rotated by a magnetic force generated between the second magnet 18 provided in the conveyance track 4 and the first magnet 48.

Figure 6:
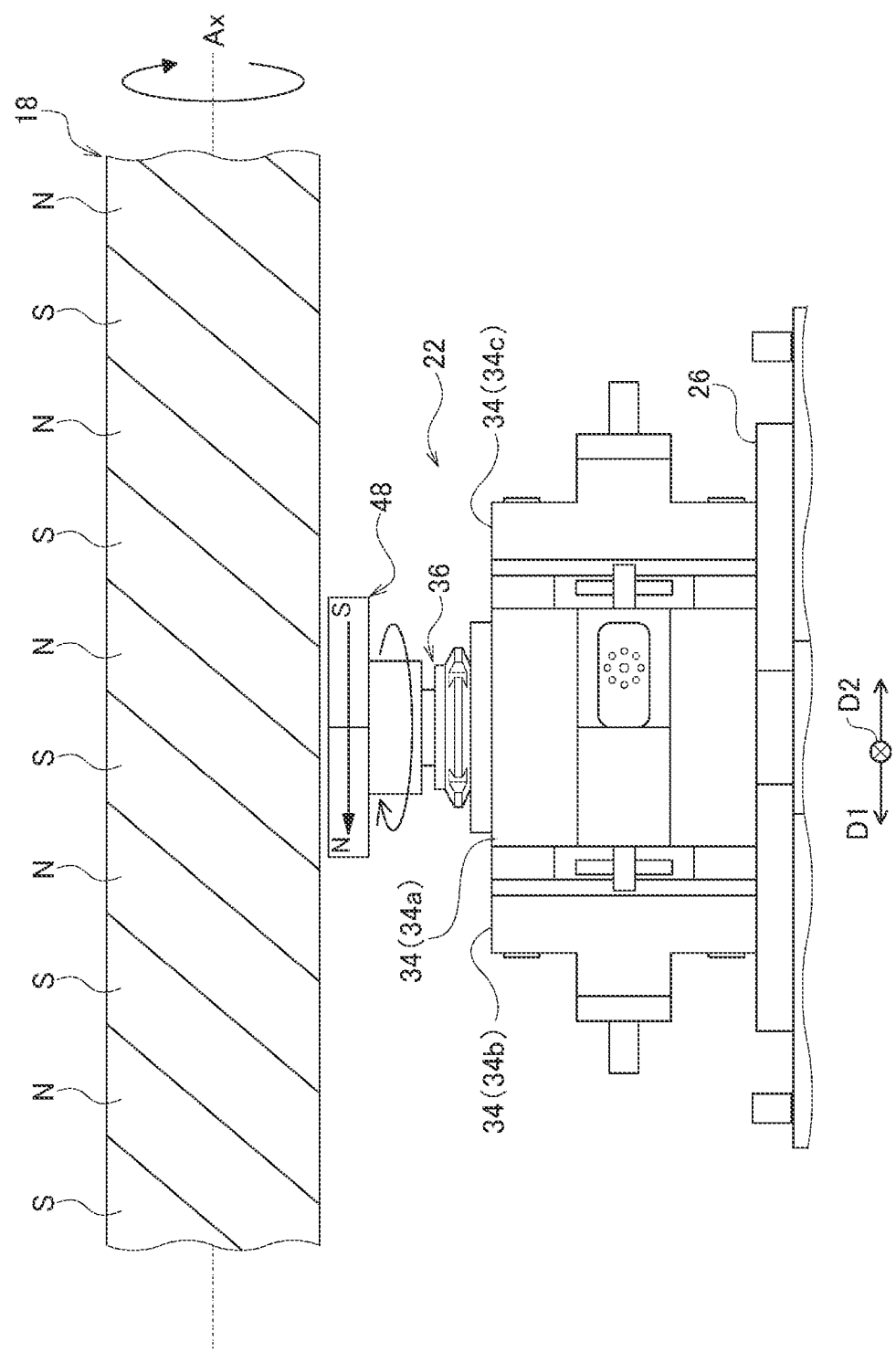
FIG. 6 shows a mechanism to rotate the shaft part.

FIG. 6 shows a mechanism to rotate the shaft part 36. As shown in FIG. 6, the second magnet 18 is arranged in proximity to the holding head 2 to generate a magnetic force between the second magnet 18 and the first magnet 48 of the holding head 2 conveyed. Further, the second magnet 18 is configured to alternately generate a magnetic force from the N pole and a magnetic force from the S pole in the conveyance direction D1 of the holding head 2. The second magnet 18 of this embodiment is magnetized to result in N poles and S poles alternating in the conveyance direction D1 of the holding head 2. The second magnet 18 is, for example, a permanent magnet. Thus, the magnetic pole of the portion in the second magnet 18 applying a magnetic force to the first magnet 18 (e.g., the portion in the second magnet 18 closest to the first magnet 48) is alternately switched as the holding head 2 is conveyed. This generates a torque in the shaft part 36, causing the first pump unit 34a—the fourth pump unit 34d to suck the surrounding air via the holding part 28 to generate a holding force in the holding part 28.

Further, the second magnet 18 of this embodiment is configured such that N poles and S poles are spirally formed around the rotation axis Ax extending in the conveyance direction D1 of the holding head 2. Further, the second magnet 18 is rotated around the rotation axis Ax. The rotation of the second magnet 18 is realized by, for example, causing the control device 16 to control the motor (not shown) connected to the second magnet 18. By rotating the second magnet 18 having N poles and S poles spirally formed thereon, the magnetic pole of the portion in the second magnet 18 applying a magnetic force to the first magnet 18 is alternately switched even when the holding head 2 is at a rest. It is therefore possible to maintain the rotation of the shaft part 36 and continue to generate the holding force in the holding part 28 even while the holding head 2 is at rest.

The rotating speed of the second magnet 18 and the conveyance speed of the holding head 2 are adjusted so as not to fix the magnetic pole of the portion where a magnetic force is generated between the second magnet 18 and the first magnet 48. Further, the arrangement of the N poles and the S poles in the respective magnets and the relative positions of the magnets necessary to rotate the shaft part 36 can be set as appropriate based on an experiment, simulation, etc. by the designer. Further, the second magnet 18 shown in FIG. 1 is non-contiguous in part in the range from the reception part 12 to the delivery part 14. In this case, the length of a region in which the second magnet 18 is non-existent is set in accordance with the time elapsed since the shaft part 36 stops being rotated until the holding force (suction force) of the holding part 28 is lost and with the conveyance speed of the holding head 2.

Figure 7:
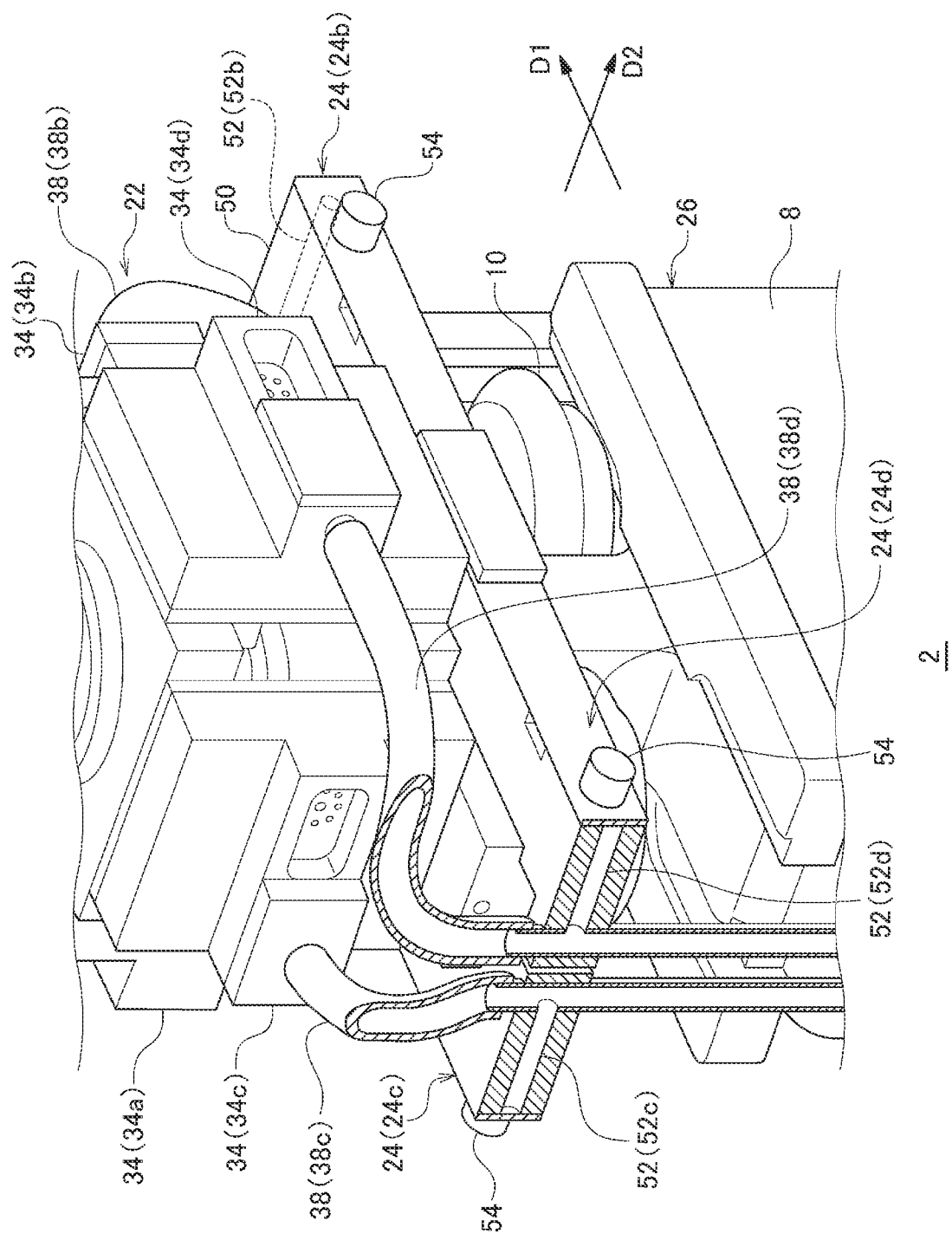
FIG. 7 is a perspective view showing a part of the holding head including the holding cancellation valve on an enlarged scale.
Figure 8A:
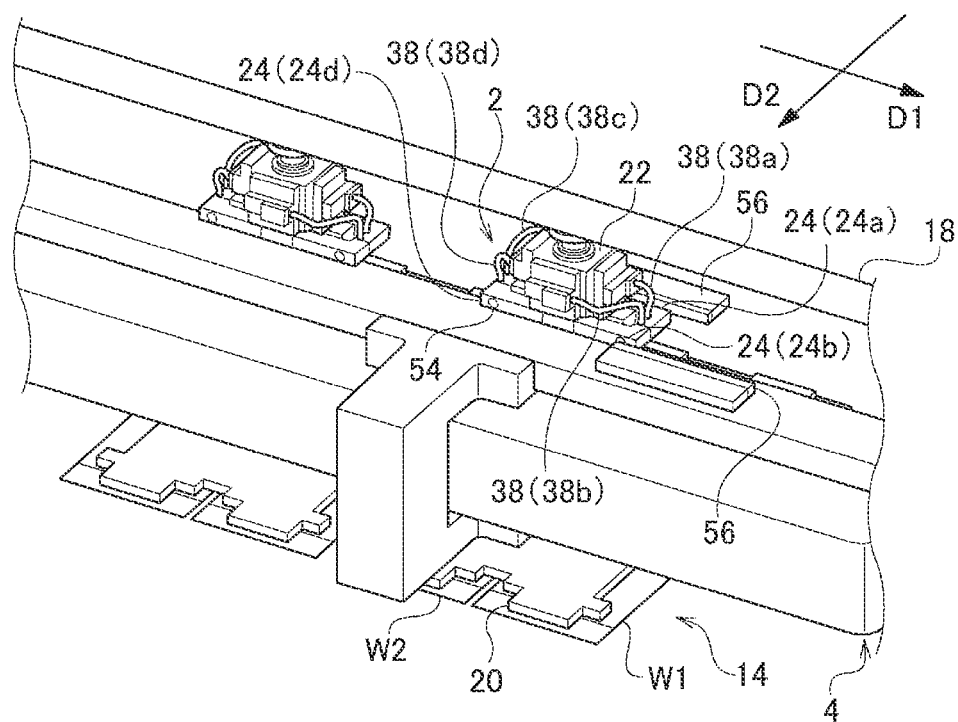
FIGS. 8A and 8B are perspective views showing a part of the conveyance track including the delivery part on an enlarged scale.
Figure 8B:
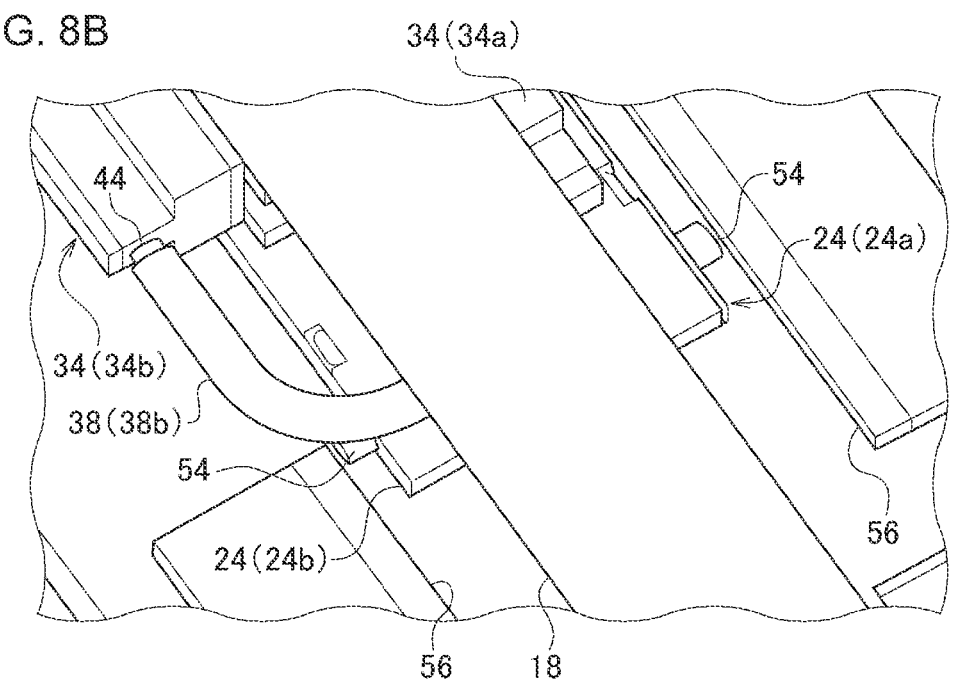
Figure 9:
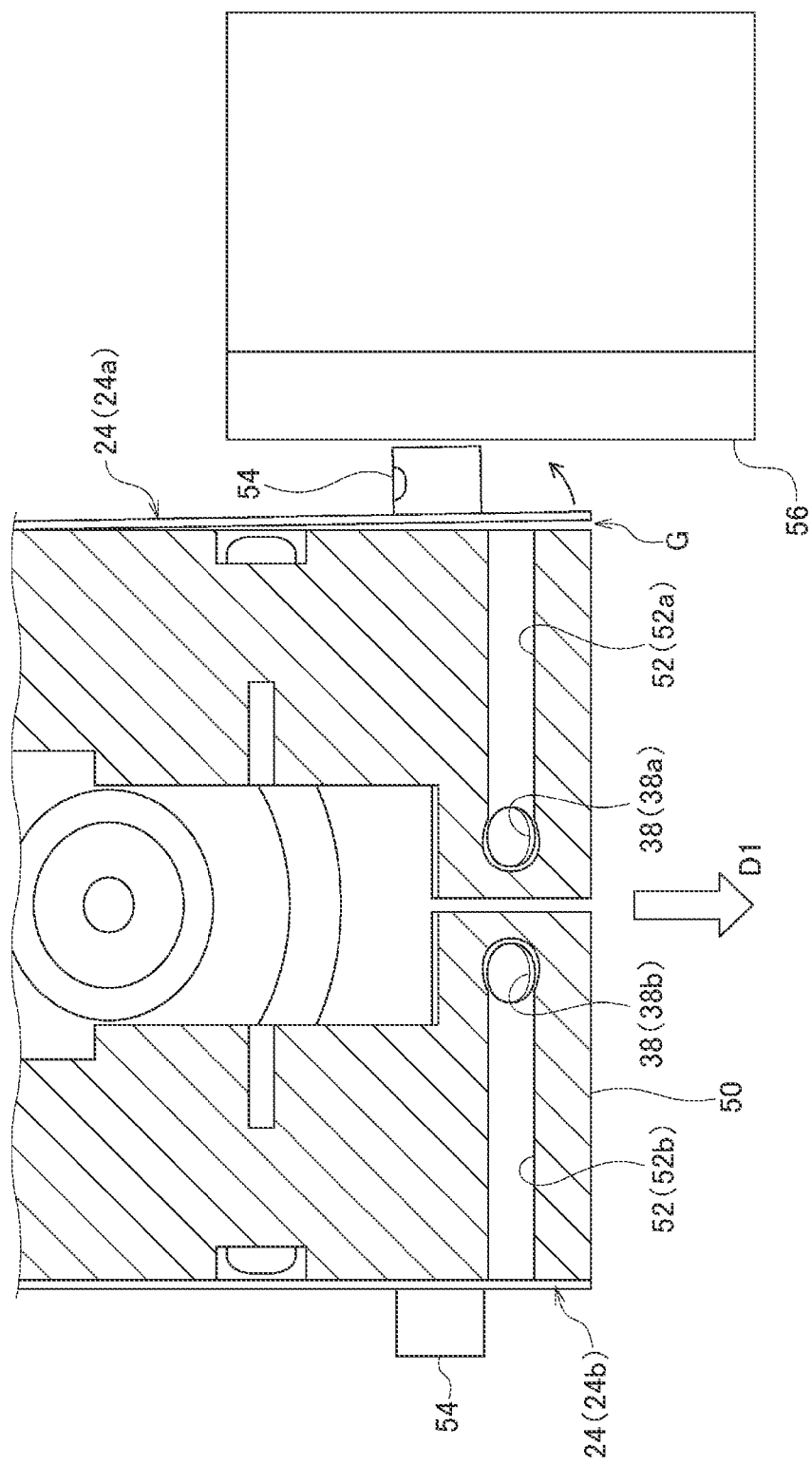
FIG. 9 shows the opening and closing action of the holding cancellation valve.

The holding cancellation valve 24 is a valve for canceling the holding force of the holding part 28. FIG. 7 is a perspective view showing a part of the holding head 2 including the holding cancellation valve 24 on an enlarged scale. FIGS. 8A and 8B are perspective views showing a part of the conveyance track 4 including the delivery part 14 on an enlarged scale. FIG. 9 shows the opening and closing action of the holding cancellation valve 24. In FIG. 8A, illustration of the laminating device 200 is omitted.

As shown in FIG. 7, the holding cancellation valve 24 is comprised of, for example, a plate spring and is fixed to a base plate 50 elongated in the conveyance direction D1. The base plate 50 is fixed to the support part 26 between the vacuum pump 22 and the pad part 20. The vacuum pipe 38 is provided to extend through the base plate A branch pipe 52 joined to the vacuum pipe 38 is provided inside the base plate 50. One end of the branch pipe 52 is joined to the vacuum pipe 38 and the other end opens to the space outside the base plate 50. In this embodiment, the branch pipe 52 is joined to each of the first vacuum pipe 38a—the fourth vacuum pipe 38d. Hereafter, the branch pipe 52 joined to the first vacuum pipe 38a is referred to as a first branch pipe 52a, the branch pipe joined to the second vacuum pipe 38b is referred to as a second branch pipe 52b, the branch pipe 52 joined to the third vacuum pipe 58c is referred to as a third branch pipe 52c, and the branch pipe 52 joined to the fourth vacuum pipe 58d is referred to as a fourth branch pipe 52d.

In further accordance with this embodiment, two open ends of the branch pipes 52 are arranged on either side of the base plate 50 in the perpendicular direction D2. Further, the two open ends are arranged in the conveyance direction D1 on either side of the base plate 50. The open end of the first branch pipe 52a is provided in front in the conveyance direction D1 on one side of the base plate 50. The open end of the third branch pipe 52c is provided behind in the conveyance direction D1 on one side of the base plate 50. The open end of the second branch pipe 52b is provided in front in the conveyance direction D1 on the other side of the base plate 50. The open end of the fourth branch pipe 52d is provided behind in the conveyance direction D1 on the other side of the base plate 50.

The open end of each branch pipe 52 is blocked by the holding cancellation valve 24. In this embodiment, one plate spring elongated in the conveyance direction D1 is fixed one each to either side of the base plate 50 in the perpendicular direction D2. The ends of each plate spring block the open ends of the branch pipe 52 respectively and function as the holding cancellation valve 24. By switching between a state in which each holding cancellation valve 24 is closed (a state in which the open end of the branch pipe 52 is blocked) and a state in which each holding cancellation valve 24 is open (a state in which the open end of the branch pipe 52 communicates with the surrounding air), it is possible to hold or discharge the workpiece W. Hereinafter, the holding cancellation valve 24 blocking the open end of the first branch pipe 52a is referred to as a first holding cancellation valve 24a, the holding cancellation valve 24 blocking the open end of the second branch pipe 52b is referred to as a second holding cancellation valve 24b, the holding cancellation valve 24 blocking the open end of the third branch pipe 52c is referred to as a third holding cancellation valve 24c, and the holding cancellation valve 24 blocking the open end of the fourth branch pipe 52d is referred to as a fourth holding cancellation valve 24d.

The front workpiece W1 is switchably held and discharged by the first holding cancellation valve 24a and the second holding cancellation valve 24b. The rear workpiece W2 is switchably held and discharged by the third holding cancellation valve 24c and the fourth holding cancellation valve 24d.

Each holding cancellation valve 24 includes a third magnet 54 on the surface facing outward in the perpendicular direction D2. The third magnet 54 is, for example, a permanent magnet. In this embodiment, the third magnet 54 is provided on either end of the plate spring constituting the first holding cancellation valve 24a and the third holding cancellation valve 24c. Similarly, the third magnet 54 is provided on either end of the plate spring constituting the second holding cancellation valve 24b and the fourth holding cancellation valve 24d.

As shown in FIGS. 8A and 8B, the conveyance track 4 includes a fourth magnet 56 at a position where the holding head 2 discharges the workpiece W, i.e., in the delivery part 14. The fourth magnet 56 is, for example, an electromagnet. Energization and de-energization of the fourth magnet 56 is controlled by, for example, the control device 16. The fourth magnet 56 is arranged to generate a magnetic force between the fourth magnet 56 and the third magnet 54 provided in the holding head 2 arriving at the delivery part 14.

As shown in FIG. 9, the holding cancellation valve 24 is switchably opened or closed by the magnetic force generated between the third magnet 54 and the fourth magnet 56. In this embodiment, an attracting magnetic force is generated between the third magnet 54 and the fourth magnet 56. When a magnetic force is generated between the magnets, the plate spring constituting the holding cancellation valve 24 is elastically deformed in a direction distanced from the base plate 50. In other words, the holding cancellation valve 24 is put in an open state. This creates a gap G between the base plate 50 and the plate spring so that the open end of the branch pipe 52 communicates with the surrounding air. As a result, the atmospheric air is drawn into the vacuum pipe 38 via the branch pipe 52, canceling the holding force (suction force) of the holding part 28. When the magnetic force between the third magnet 54 and the fourth magnet 56 is lost, the plate spring returns to the original state and blocks the open end of the branch pipe 52. In other words, the holding cancellation valve 24 is put into a closed state. As a result, the holding force of the holding part 28 is restored.

The fourth magnet 56 are arranged in each delivery part 14 one each on either side to sandwich the holding head 2 in the perpendicular direction D2. Further, the two fourth magnets 56 provided in each delivery part 14 are arranged with a displacement in the conveyance direction D1. More specifically, the fourth magnet 56 that faces the open ends of the first branch pipe 52a and the third branch pipe 52c is displaced rearward (upstream) in the conveyance direction D1 with respect to the fourth magnet 56 that faces the open ends of the second branch pipe 52b and the fourth branch pipe 52d. Therefore, the cancellation of the suction of the front workpiece W1 by the first suction hole group 30a occurs before the cancellation of the suction of the front workpiece W1 by the second suction hole group 30b. Further, the cancellation of the suction of the rear workpiece W2 by the third suction hole group 30c occurs before the cancellation of the suction of the rear workpiece W2 by the fourth suction hole group 30d.

By way of one example, the first holding cancellation valve 24a is opened first when the holding head 2 passes through the upstream delivery part 14 in the second track 4b or the third track 4c. This causes vacuum break in the front part of the front workpiece W1, causing the front part to be delivered to the laminating device 200. When the holding head 2 advances further, the second holding cancellation valve 24b is opened. This causes vacuum break in the rear part of the front workpiece W1, causing the rear part to be delivered to the laminating device 200. Further, when the front workpiece W1 is delivered to the laminating device 200, the control device 16 cancels energization of the fourth magnet 56 until the holding head 2 passes through the upstream delivery part 14 completely.

This causes the holding head 2 to advance to the downstream delivery part 14, maintaining adsorptive holding of the rear workpiece W2. The third holding cancellation valve 24c is opened to deliver the front part of the rear workpiece W2 to the laminating device 200 in the downstream delivery part 14, and the fourth holding cancellation valve 24d is then opened to deliver the rear part of the rear workpiece W2 to the laminating device 200. The rear workpiece W2 may be delivered to the laminating device 200 in the upstream delivery part 14, and the front workpiece W1 may be delivered to the laminating device 200 in the downstream delivery part 14.

As described above, the workpiece conveyance device 1 according to this embodiment includes the multiple holding heads 2 having the holding part 28 for holding the workpiece W and the vacuum pump 22 for generating a holding force in the holding part 28, and the conveyance track 4 for conveying the multiple holding heads 2. The vacuum pump 22 includes the pump unit 34 that communicates with the holding part 28 to suck the surrounding air via the holding part 28 and includes the shaft part 36 rotated to activate the pump unit 34. The shaft part 36 includes the first magnet 48 magnetized to result in N poles and S poles alternating around the shaft. The conveyance track 4 includes the second magnet 18 extending in the conveyance direction D1 of the holding head 2, the second magnet 18 being configured to alternately apply a magnetic force from the N pole and a magnetic force from the S pole in the conveyance direction D1 and being arranged to generate a magnetic force between the second magnet 18 and the first magnet 48 of the holding head 2 conveyed. By alternately switching the magnetic pole of the portion in the second magnet 18 applying a magnetic force to the first magnet 48, the shaft part 36 is rotated, which causes the pump unit 34 to generate a holding force by sucking the surrounding air.

The workpiece conveyance device 1 of this embodiment is configured such that the vacuum pump 22 is mounted on the holding head 2, and the action of the first magnet 48 and the second magnet 18 rotates the shaft part 36 to generate a holding force in the holding part 28. It therefore makes it possible to omit installation of vacuum pipes and wirings that are necessary in the case the vacuum pump and the driving power supply are installed outside to move the holding head or in the case the driving power supply is installed outside to move the holding head carrying a vacuum pump. Accordingly, the design flexibility of the workpiece conveyance device 1 is increased.

Further, the second magnet 18 of this embodiment is rotated around the rotation axis Ax extending in the conveyance direction D1, and N poles and S poles are spirally formed around the rotation axis Ax. The magnetic pole of the portion in the second magnet 18 applying a magnetic force to the first magnet 48 is alternately switched in accordance with the rotation of the second magnet 18. This makes it possible to continue rotating the shaft part 36 and maintain a holding force of the holding part 28 even when the holding head 2 comes to a stop. In the case the surface of the workpiece W delivered and the holding part 28 are both planar, for example, it is desired to deliver and receive the workpiece W by bringing the holding head 2 to a stop in order to mitigate the load exerted on the workpiece W when it is delivered. According to the holding head 2 of this embodiment capable of receiving the workpiece W in a stopped state, on the other hand, it is possible to deliver and receive the workpiece W between planar surfaces while at the same time mitigating the load on the workpiece W. If delivery takes place between curved surfaces or between a curved surface and a planar surface, it is possible to deliver and receive the workpiece W without applying a heavy load on the workpiece W even if the holding head 2 is kept moving.

Further, the vacuum pump 22 of this embodiment includes multiple pump units 34. This makes it possible to organize the holding part 28 into multiple regions and generate a holding force in each region independently. It is also possible to extend the area of the holding part 28 or increase the holding force. Further, each pump unit 34 is activated by the rotation of the common shaft part 36 to generate a suction force. This can prevent the structure of the holding head 2 from becoming complicated due to an increase in the number of pump units 34. Only one pump unit 34 may be provided, or the number of pump units 34 may be other than four.

The holding head 2 of this embodiment holds one workpiece W by means of at least two pump units 34. Further, the holding head 2 holds multiple workpieces W. More specifically, the first pump unit 34a and the second pump unit 34b hold the front workpiece W1. Further, the third pump unit 34c and the fourth pump unit 34d hold the rear workpiece W2. By using two or more pump units 34 to hold one workpiece W, it is possible to discharge the workpiece W in multiple stages. This makes it possible to deliver the workpiece W to the laminating device 200 more accurately than otherwise. By causing the holding head 2 to hold multiple workpieces W, the throughput of the workpiece conveyance device 1 is increased. One workpiece W may be held by means of a single pump unit 34 or three or more pump units 34. Further, the holding head 2 may hold one workpiece W or three or more workpieces W.

The holding head 2 of this embodiment includes the holding cancellation valve 24 that cancels the holding force of the holding part 28. The holding cancellation valve 24 includes the third magnet 54. The conveyance track 4 includes the fourth magnet 56 arranged at a position where the holding head 2 discharges the workpiece W so as to generate a magnetic force between the fourth magnet 56 and the third magnet 54. The holding cancellation valve 24 is switchably opened or closed by the magnetic force generated between the third magnet 54 and the fourth magnet 56. This makes it possible to cancel the holding force of the holding part 28 with a simple mechanism. Accordingly, the size of the vacuum pump 22 and, ultimately, the holding head 2 is prevented from becoming too large.

Further, the conveyance track 4 of this embodiment branches into multiple tracks. This increases the flexibility of arrangement of the destination of conveyance of the workpiece W. By arranging a device with a short takt time at the root of the branch of the conveyance track 4 and arranging a device with a long takt time at each destination of the branch, the production speed of the device with a short takt time is prevented from being sacrificed.

The workpiece W of this embodiment is a laminated sheet 300 in which the electrode plate and the separator are laminated. The conveyance track 4 includes the reception part 12 where the holding head 2 receives the laminated sheet 300 from the laminated sheet manufacturing device 100 and includes the delivery part 14 where the holding head 2 discharges the laminated sheet 300 to the laminating device 200. Multiple delivery parts 14 are provided for one reception part 12.

The takt time of the laminated sheet manufacturing device 100 (the time required to manufacture the laminated sheet 300 and deliver it to the holding head 2) tends to be shorter than the takt time of the laminating device 200 (the time required to manufacture the laminated electrode body 302 and retrieve it from the lamination stage 200b). By providing multiple delivery parts 14 for one reception part 12, therefore, the production speed of the laminated electrode body 302 is increased. The delivery part 14 is provided in each destination of the branch of the conveyance track 4. This can suppress the conveyance track 4 from becoming too long as compared with the case of arranging the multiple delivery parts 14 in series.

In further accordance with the workpiece conveyance device 1 of this embodiment, electric power can be generated by using the rotation of the shaft part 36. The electric power obtained from this can be used, for example, as a drive source of sensors mounted on the holding head 2.

Embodiment 2

Embodiment 2 has a configuration common to embodiment 1 except for the structure of the second magnet 18. The following description of this embodiment highlights features different from those of embodiment 1, and the description of the common features will be simplified or omitted.

Figure 10:
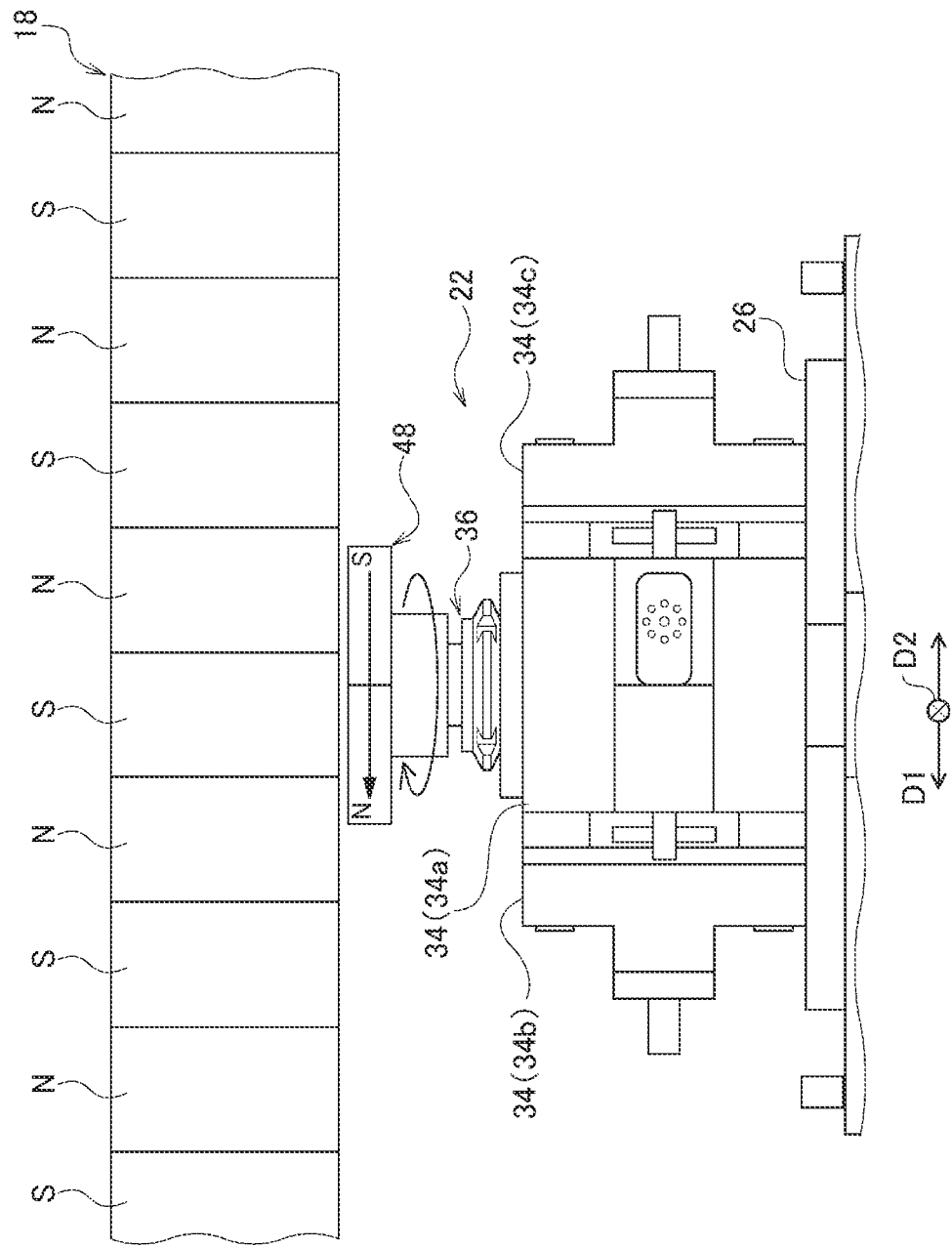
FIG. 10 shows a mechanism for rotating the shaft part in the workpiece conveyance device according to embodiment 2.

FIG. 10 shows a mechanism for rotating the shaft part 36 in the workpiece conveyance device 1 according to embodiment 2. As in embodiment 1, the second magnet 18 of this embodiment alternately generates a magnetic force from the N pole and a magnetic force from the S pole in the conveyance direction D1 of the holding head 2. By way of one example, the second magnet 18 is magnetized to result in N poles and S poles alternating in the conveyance direction D1 of the holding head 2. Meanwhile, the second magnet 18 of this embodiment, unlike that of embodiment 1, is not rotated around the rotation axis Ax. In this configuration, too, the magnetic pole of the portion in the second magnet 18 applying a magnetic force to the first magnet 48 is alternately switched in accordance with the conveyance (movement) of the holding head 2. This rotates the shaft part 36 and activates the first pump unit 34a—the fourth pump unit 34d.

Thus, the workpiece conveyance device 1 of this embodiment also increases the design flexibility of the workpiece conveyance device 1. In the workpiece conveyance device 1 of this embodiment, it is necessary to keep moving the holding head 2 to maintain the holding force of the holding part 28, but the mechanism for rotating the second magnet 18 is omitted so that the structure of the workpiece conveyance device 1 is simplified.

Embodiments of the present disclosure have been described above in detail. The embodiments described above are merely specific examples of practicing the present disclosure. The details of the embodiments shall not be construed as limiting the technical scope of the present disclosure. A number of design modifications such as modification, addition, deletion, etc. of constituting elements may be made to the extent that they do not depart from the idea of the invention defined by the claims. New embodiments with design modifications will provide the combined advantages of the embodiment and the variation. Although the details subject to such design modification are emphasized in the embodiments by using phrases such as "of this embodiment" and "in this embodiment", details not referred to as such are also subject to design modification. Any combination of constituting elements included in the respective embodiments is also useful as an embodiment of the present disclosure. Hatching in the cross section in the drawings should not be construed as limiting the material of the hatched object.

(Variation 1)

In embodiments 1, 2, the suction force as the holding force is generated by using the pump unit 34 to suck the surrounding air via the holding part 28. Alternatively, the holding force may be generated by using the pump unit 34 to discharge the surrounding air to the holding part 28. For example, the holding part 28 is comprised of a driving mechanism such as a cylinder for driving a target in response to a pressure and a gripping claw, etc. driven by the driving mechanism to switchably grip and discharge the workpiece W. The air outlet 46 of the pump unit 34 and the holding part 28 communicate via the vacuum pipe 38. When the pump unit 34 is driven, the surrounding air is discharged to the holding part 28 to give a pressure to the driving mechanism. This causes the gripping claw to grip the workpiece W. In other words, it is possible to generate a holding force in the holding part 28 by using the pump unit 34 to discharge the surrounding air to the holding part 28.

(Variation 2)

Figure 11:
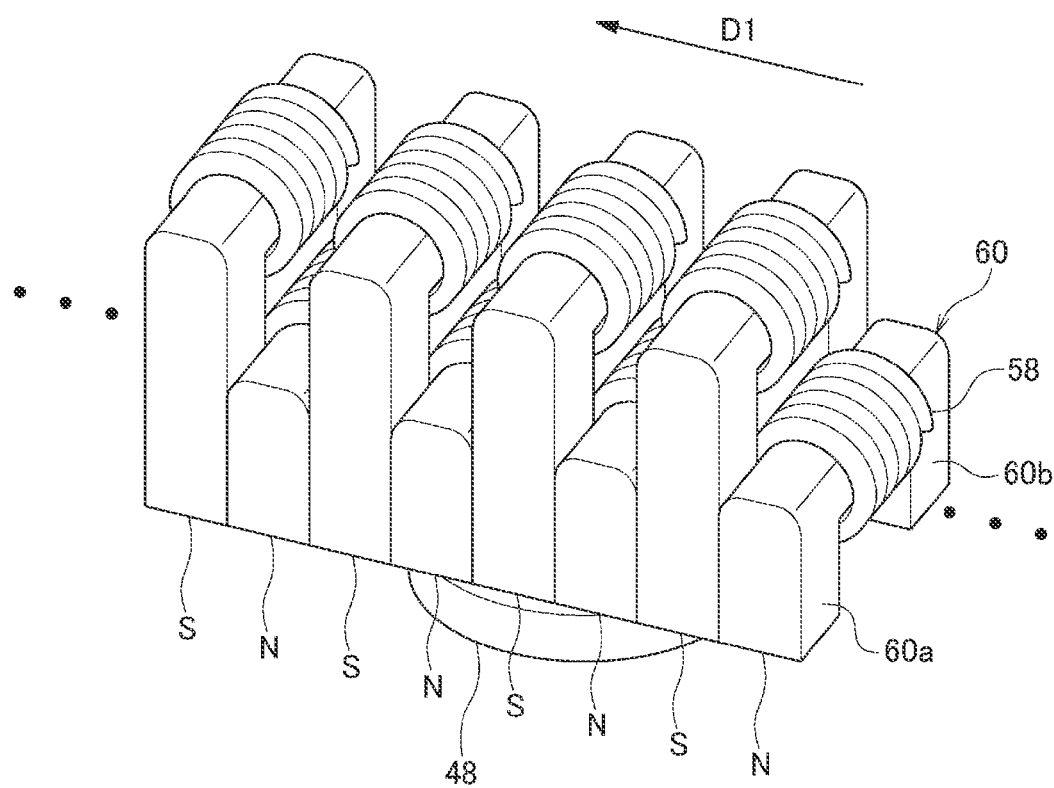
FIG. 11 is a perspective view of a part of the second magnet provided in the workpiece conveyance device according to variation 2.

The second magnet 18 of embodiments 1, 2 is a permanent magnet magnetized to result in N poles and S poles alternating in the conveyance direction D1 of the holding head 2. Alternatively, the second magnet 18 may be comprised of an electromagnet. FIG. 11 is a perspective view of a part of the second magnet 18 provided in the workpiece conveyance device 1 according to variation 2.

The second magnet 18 of variation 2 has, by way of one example, a structure in which multiple substantially U-shaped magnetic members 60 in which a coil 58 is wound are arranged in series in the conveyance direction D1. By inducing a current in the coil 58 wound around the middle part of each magnetic member 60, a magnetic force is generated at a first end 60a and a second end 60b. The first end 60a of each magnetic member 60 is contiguous in the conveyance direction D1 and is arranged to generate a magnetic force between the magnetic member 60 and the first magnet 48 of the holding head 2 conveyed. Each coil 58 is energized to generate magnetic forces from different poles in adjacent first ends 60a. In this manner, the second magnet 18 alternately generates a magnetic force from the N pole and a magnetic force from the S pole in the conveyance direction D1 of the holding head 2. Energization of each coil 58 is controlled by, for example, the control device 16.

The invention claimed is:

1. A workpiece conveyance device comprising:
a plurality of holding heads that include a holding part that holds a workpiece and a vacuum pump that generates a holding force in the holding part; and
a conveyance track that conveys the plurality of holding heads, wherein
the vacuum pump includes a pump unit that connects with the holding part to suck a surrounding air from the holding part or to discharge the surrounding air to the holding part, the vacuum pump further including a shaft part that is rotated to activate the pump unit,
the shaft part includes a first magnet magnetized in an alternating N poles and S poles around a shaft,
the conveyance track includes a second magnet extending in a conveyance direction of the holding head, the second magnet alternately generating a magnetic force from the N pole and a magnetic force from the S pole in the conveyance direction and being arranged to generate a magnetic force between the second magnet and the first magnet of the holding head conveyed, and
the first magnet provided on the vacuum pump in the holding heads and the second magnet provided on the conveyance track interact with each other by alternately switching a magnetic pole of a portion in the second magnet applying a magnetic force to the first magnet to rotate the shaft part and to drive the pump unit to generate a holding force by sucking or discharging the surrounding air.

2. The workpiece conveyance device according to claim 1, wherein the second magnet is rotated around a rotation axis extending in the conveyance direction, N poles and S poles are spirally formed around the rotation axis, and rotation of the second magnet alternately switches the magnetic pole of a portion in the second magnet applying a magnetic force to the first magnet.

3. The workpiece conveyance device according to claim 1, wherein conveyance of the holding head alternately switches the magnetic pole of a portion in the second magnet applying a magnetic force to the first magnet.

4. The workpiece conveyance device according to claim 1, wherein
the vacuum pump includes a plurality of pump units, and
the pump units generate the holding force as the shaft part common to the pump units is rotated.

5. The workpiece conveyance device according to claim 4, wherein the holding head holds one workpiece by means of at least two pump units.

6. The workpiece conveyance device according to claim 4, wherein the holding head holds a plurality of workpieces.

7. The workpiece conveyance device according to claim 1, wherein
the holding head includes a holding cancellation valve that cancels the holding force,
the holding cancellation valve includes a third magnet,
the conveyance track includes a fourth magnet arranged at a position where the holding head discharges the workpiece so as to generate a magnetic force between the fourth magnet and the third magnet, and
the holding cancellation valve cancels the holding force by being switchably opened or closed by a magnetic force generated between the third magnet and the fourth magnet.

8. The workpiece conveyance device according to claim 1, wherein the conveyance track branches into a plurality of tracks.

9. The workpiece conveyance device according to claim 1, wherein the workpiece includes at least one of an electrode plate or a separator.

10. The workpiece conveyance device according to claim 9, wherein
the workpiece is a laminated sheet in which the electrode plate and the separator are laminated,
the conveyance track includes a reception part where the holding head receives the laminated sheet from a laminated sheet manufacturing device and a delivery part where the holding head discharges the laminated sheet to a laminating device that manufactures a laminated electrode body by laminating a plurality of unit laminated bodies, and a plurality of delivery parts are provided for one reception part.

\* \* \* \* \*